US009019423B2

(12) United States Patent
Seol et al.

(10) Patent No.: US 9,019,423 B2
(45) Date of Patent: Apr. 28, 2015

(54) APPARATUS AND METHOD OF CONTROLLING DRIVE OF CAMERA MODULE

(71) Applicant: Jahwa Electronics Co., Ltd., Chungcheongbuk-do (KR)

(72) Inventors: Jin-Soo Seol, Chungcheongbuk-do (KR); Young-Seok Kim, Chungcheongbuk-do (KR); Byung-Chan Park, Chungcheongbuk-do (KR)

(73) Assignee: Jahwa Electronics Co., Ltd., Cheongwon-gun, Chungcheongbuk-do (KR)

( * ) Notice: Subject to any disclaimer, the term of this patent is extended or adjusted under 35 U.S.C. 154(b) by 153 days.

(21) Appl. No.: 13/689,233

(22) Filed: Nov. 29, 2012

(65) Prior Publication Data

US 2013/0258172 A1    Oct. 3, 2013

(30) Foreign Application Priority Data

Mar. 30, 2012    (KR) ........................ 10-2012-0033611

(51) Int. Cl.
*H04N 5/232* (2006.01)
*G03B 3/10* (2006.01)
*H04N 5/225* (2006.01)

(52) U.S. Cl.
CPC ............. *H04N 5/232* (2013.01); *H04N 5/2253* (2013.01); *G03B 3/10* (2013.01); *G03B 2205/0069* (2013.01)

(58) Field of Classification Search
CPC ... H04N 5/232; H04N 5/2252; H04N 5/2253; H04N 5/2257; G03B 3/10; G03B 2205/0069
USPC .......... 348/373, 335, 345, 357; 359/808, 811
See application file for complete search history.

(56) References Cited

U.S. PATENT DOCUMENTS

| 7,589,920 | B2 * | 9/2009 | Shin et al. ..................... 359/811 |
| 2008/0253003 | A1 * | 10/2008 | Shin et al. ..................... 359/824 |
| 2010/0182490 | A1 * | 7/2010 | Seol et al. ..................... 348/345 |
| 2010/0208369 | A1 * | 8/2010 | Shin ............................. 359/811 |

FOREIGN PATENT DOCUMENTS

JP     2010-160435 A    7/2010
KR    1020090129717    12/2009

(Continued)

OTHER PUBLICATIONS

Examination report dated Jul. 15, 2014 in connection with counterpart Taiwan Application of Korean Application No. 10-2012-0033611 and U.S. Appl. No. 13/689,233.

*Primary Examiner* — Nhan T Tran
(74) *Attorney, Agent, or Firm* — Mintz Levin Cohn Ferris Glovsky and Popeo, P.C.; Kongsik Kim; Jonathan P. Western

(57) ABSTRACT

The present invention discloses a drive control apparatus of a camera module and a method of controlling camera module drive. The drive control apparatus of the camera module according to an embodiment of the present invention comprises: a lens module movable along an optical axis; a first and a second stoppers defining maximum moving section of the lens module; and a controller for determining an available moving section by applying a first determined correction value to the maximum moving section so as to make the lens module to move between locations spaced from the first and second stoppers with a predetermined distance. According to the present invention, it is advantageously possible to reduce the electric current consumption when performing auto-focusing function.

11 Claims, 11 Drawing Sheets

(56) References Cited

FOREIGN PATENT DOCUMENTS

| KR | 1020100048246 | 5/2010 |
| TW | 2007-00789 A | 1/2007 |
| TW | 2009-35157 A | 8/2009 |
| TW | 2010-07245 A | 2/2010 |

\* cited by examiner

--Prior Art--

--Prior Art--

APPARATUS AND METHOD OF CONTROLLING DRIVE OF CAMERA MODULE

PRIORITY

This application claims the benefit under 35 U.S.C. h 119(a) of a Korean Patent Application filed in the Korean Intellectual Property Office on Mar. 30, 2012 and assigned Serial No. 10-2012-0033611, the entire disclosure of which is incorporated herein by reference.

BACKGROUND OF THE INVENTION

1. Field of the Invention

The present invention relates generally to a camera module, and particularly, to an apparatus and a method for controlling operation of a camera module having an auto-focusing device installed therewith.

2. Description of the Related Art

Recently, portable devices mounted with a small and light camera module increase with the development of the technique related to a digital camera. This type of camera module generally adopts the auto-focusing function, which corrects the out-focusing caused by a distance from a subject when taking a picture.

The auto-focusing function is implemented by a forward and backward movement of a lens module along an optical axis. Generally, the drive force by means of electric current is used when the lens module moves in a direction, while the attraction force between a magnetic member and a metallic yoke is used when the lens module moves in the other direction, wherein the magnetic member is attached to a side of the lens module and the metallic yoke is oppositely arranged to be spaced from the magnetic member.

Accordingly, when the lens module moves in a direction using the drive force by means of electric current, the large amount of electric current consumption is needed so as to overcome the attraction force between the magnetic member and the yoke.

Furthermore, when the lens module moves in the other direction, the moving speed of the lens module is slow because the movement of the lens module depends only on the attraction force between the magnetic member and the yoke, which leads to the delay in the auto-focusing function.

SUMMARY OF THE INVENTION

Accordingly, an object of the present invention is to provide a solution to reduce the electric current consumption when performing the auto-focusing function.

Also, the other object of the present invention is to provide a solution to perform the auto-focusing function more rapidly.

Another object of the present invention will be understood with reference to embodiments described below.

In order to accomplish the above objects, the present invention provides a drive control apparatus of a camera module, comprising: a lens module movable along an optical axis; a first stopper and a second stopper defining a maximum moving section of the lens module; and, a controller for determining an available moving section by applying a first determined correction value to the maximum moving section so as to make the lens module to move between locations spaced from the first and second stoppers with a predetermined distance.

Another embodiment of the present invention provides a drive control apparatus of a camera module, comprising: a lens module movable along an optical axis; a first stopper and a second stopper defining a maximum moving section of the lens module; and, a memory for storing a first determined value representing an end point of an available moving section in a direction and a second determined value representing an end point of the available moving section in the other direction, wherein the available moving section is determined so as to make the lens module to move between location spaced from the first and the second stoppers with a predetermined distance, respectively.

Another embodiment of the present invention provides a drive control apparatus of a camera module, comprising: a lens module movable along an optical axis; a first stopper and a second stopper defining a maximum moving section of the lens module; a magnetic member coupled to a side of the lens module; coils disposed to face the magnetic member with a distance and generating a drive force of the lens module; and, a yoke having the coils attached thereto, wherein a length of the yoke in a direction of an optical axis is defined to be greater than a length of the magnetic member in a direction of the optical axis.

Another embodiment of the present invention provides a drive control apparatus of a camera module, comprising: a lens module movable along an optical axis; a sensor for detecting a location of the lens module; a first and a second stoppers defining a maximum moving section of the lens module; a controller for determining an available moving section by applying a first determined correction value to the maximum moving section so as to make the lens module to move between locations spaced from the first and second stoppers with a predetermined distance; and a memory for storing a first determined value representing an end point of an available moving section in a direction and a second determined value representing an end point of the available moving section in the other direction, wherein the sensor, the controller and the memory are formed in the form of one-chip.

Another embodiment of the present invention provides a method of controlling drive of a camera module, comprising a lens module movable along an optical axis, and a first and a second stoppers defining a maximum moving section; the method comprising steps of: detecting the maximum moving section of the lens module; and determining an available moving section by applying a determined correction value to the maximum moving section so as to make the lens module to move between locations spaced from the first and the second stoppers with a predetermined distance.

According to the present invention, it is advantageously possible to reduce the electric current consumption when performing the auto-focusing function.

Also, according to the present invention, it is advantageously possible to perform the auto-focusing function more rapidly Also, according to the present invention, it is advantageously possible to perform the stable focusing function by means of a linear drive waveform.

Also, according to the present invention, it is advantageously possible to perform the stable focusing function by means of a linear current waveform.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Throughout the drawings, the same drawing reference numerals will be understood to refer to the same elements, features and structures.

DETAILED DESCRIPTION OF EXEMPLARY EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In the conventional camera module performing the auto-focusing function, the large amount of the electric current consumption is needed so as to overcome the returning force of the lens module caused by the attraction force between the magnetic member and the yoke when the lens module moves in a direction. Also, the moving speed of the lens module is slow because the lens module moves only by means of the returning force of the lens module due to the attraction force between the magnetic member and the yoke when the lens module moves in the other direction as described above.

Thus, an embodiment of the present invention provides a solution to minimize the returning force of the lens module due to the attraction force between the magnetic member and the yoke to thereby reduce the electric current consumption when moving the lens module.

Also, an embodiment of the present invention provides a solution to perform an active bi-directional control of the lens module to move the lens module rapidly, to thereby provide an improved auto-focusing function.

Also, an embodiment of the present invention provides a solution to perform the stable auto-focusing function representing linear drive waveform and liner current waveform.

Figure 1A:
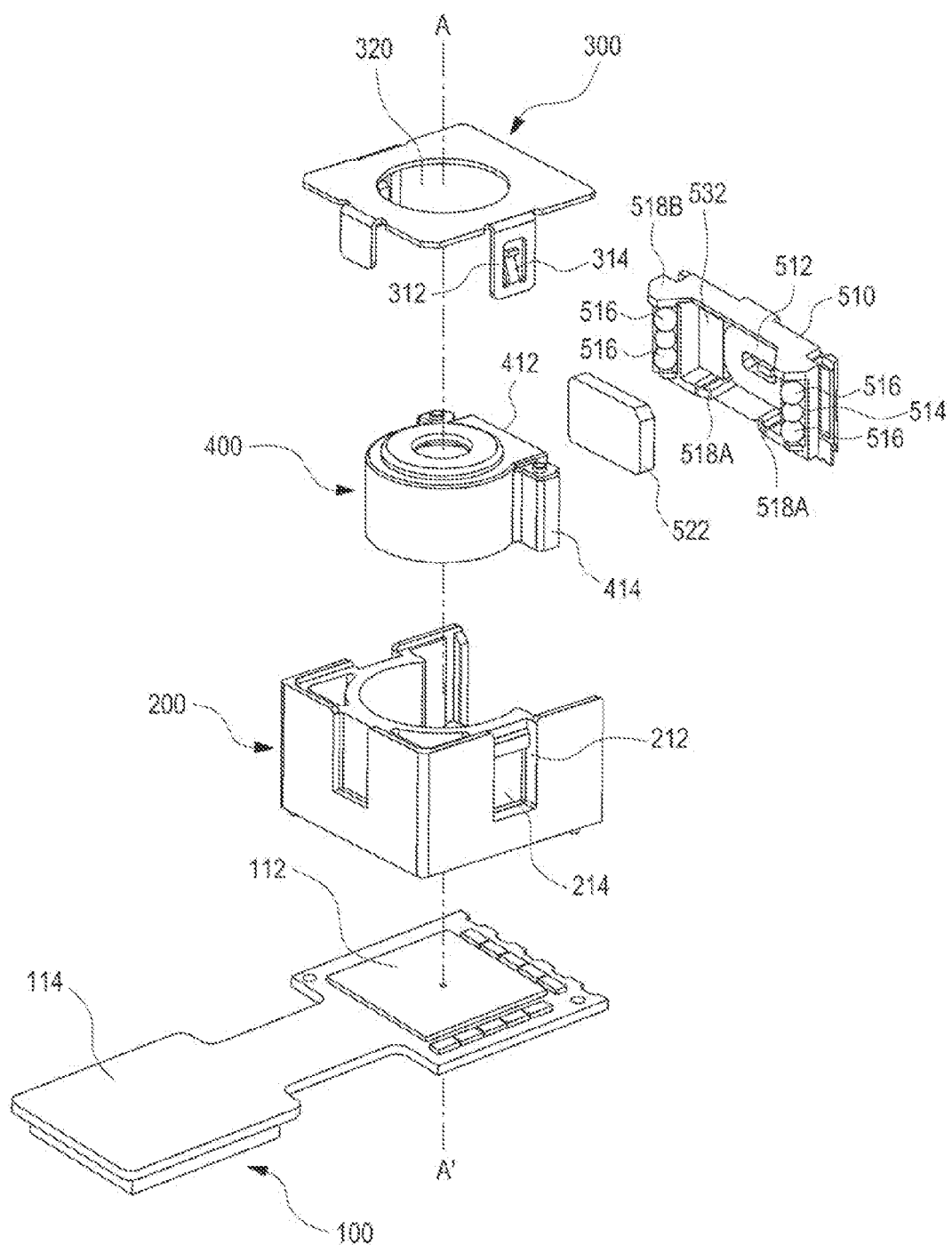
FIG. 1A is an exploded view showing a camera module according to an embodiment of the present invention.
Figure 1B:
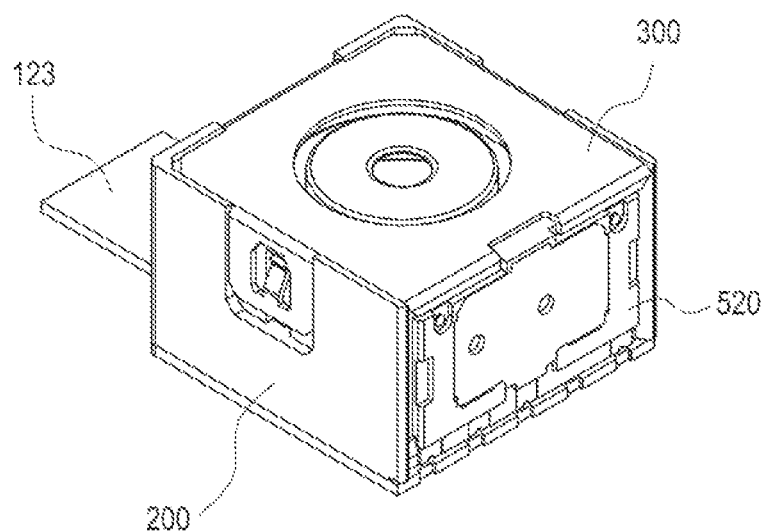
FIG. 1B is an explanatory view showing an assembled state of the camera module according to an embodiment of the present invention.
Figure 1C:
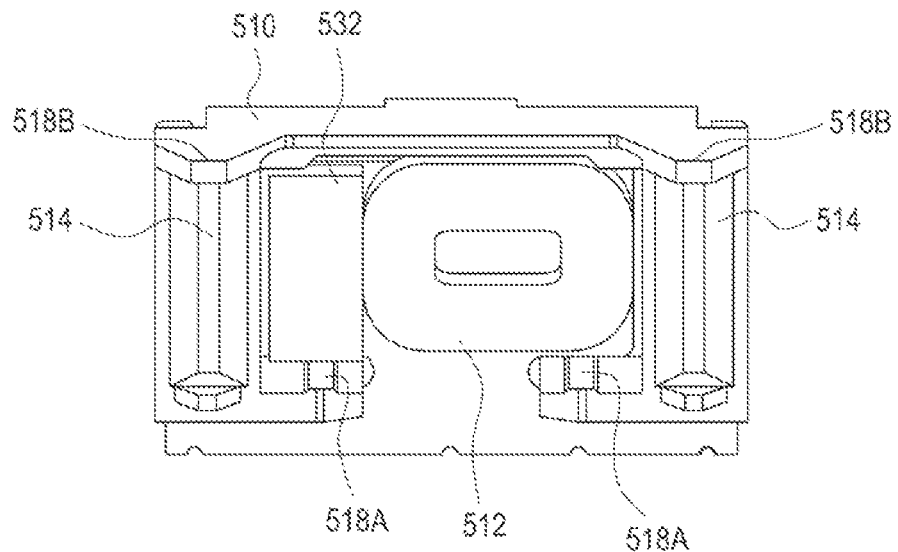
FIG. 1C is an explanatory view of a drive module according to an embodiment of the present invention.
Figure 1D:
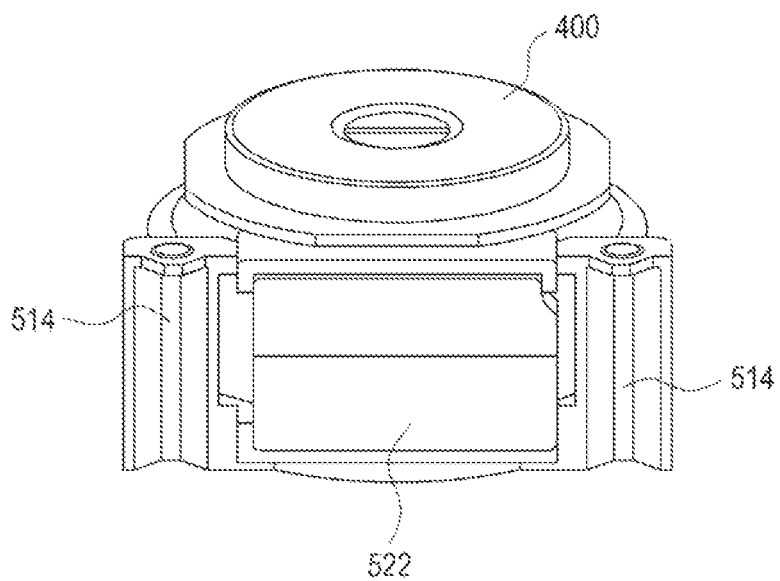
FIG. 1D is an explanatory view of a lens module according to the embodiment of the present invention.

FIG. 1A is an exploded view of a camera module according to the embodiment of the present invention; FIG. 1B shows an assembled state of the camera module according to the embodiment of the present invention; FIG. 1C is an explanatory view of a drive module according to an embodiment of the present invention; and FIG. 1D is an explanatory view of a lens module according to the embodiment of the present invention.

Referring to FIG. 1, the camera module according to the embodiment of the present invention comprises a lower frame 100 aligned along an optical axis A-A', a main frame 200, a lens module 400, a drive module 520 and an upper frame 300.

The lower frame 100 is coupled to a bottom of the main frame 200 to serve as a lower housing of the lens module 400. An image sensor 112 is mounted to the lower frame 100 to detect an image incident along the optical axis. The image sensor 112 is connected to a circuit pattern (not shown) printed on a circuit board 114 in a manner of wire bonding or a socket. The circuit board 114 may include a connector (not shown), which is connected to a predetermined circuit of a device to which the camera module is mounted.

The main frame 200 receives the lens module 400 and is coupled to the lower frame 100 and the upper frame 300. The main frame 200 has an inner part formed with an image-taking path so as to allow the lens module 400 to move forward and backward along the optical axis.

The upper frame 300 is coupled to an upper end of the main frame 200 to thereby serve as an upper housing of the lens module 400. The upper frame 300 is formed with an opening 320 through the upper frame 300 to provide the image-taking path. There are provided with a coupling piece 312 and a coupling hook 314 for fixing the upper frame 300 and the main frame 200 at a side of the upper frame 300.

The lens module 400 is received in the main frame 200 to move forward and backward along the optical axis in the image-taking path and includes at least a lens.

The drive module 520 provides driving force necessary to the forward and backward movement of the lens module 400. The drive module 520 comprises a magnetic member 522 and coils 512. The magnetic member 522 is mounted to a side of the lens module 400 and the coils 512 are mounted to a drive module frame 510 to face the magnetic member 522.

The drive module frame 510 comprises guides 514 which are coupled to a support 414 formed at the lens module 400 to guide the forward and backward movement of the lens module 400. The guides 514 may have ball bearings 516 mounted thereto, which maintain a gap between the magnetic piece 522 and the coils 512 and facilitate the forward and backward movement of the lens module 400.

A position sensor 532 is included within the drive module frame 510 to which the coils 512 are mounted. The position sensor 532 may sense a position of the lens module 400 and a change of position thereof to thereby generate a control signal necessary to the performance of the auto-focusing function. As described before, the position of the lens module 400 can be detected by sensing the position of the magnetic member 522, because the magnetic member 522 is installed in the lens module 400. It is possible to use a Hall sensor as a device for sensing a position of the magnetic member 522, which makes use of the Hall effect.

A lower stopper 518A and an upper stopper 518B are respectively included at a bottom and a top of the drive module frame 510 to define the maximum moving section of the lens module 400. Accordingly, the lens module 400 may perform the forward and backward movement within the maximum moving section defined by the lower stopper 518A and the upper stopper 518B.

A yoke (not shown) is included at an outer side of the drive module frame 510, in other words, at an opposite side of the magnetic member 522 with reference to the drive module frame 510. The yoke is made of metal, so that the attraction force between the yoke and the magnetic member 522 serves to fix the lens module 400 toward the drive module frame 510. Also, the attraction force between the yoke and the magnetic member 522 serves to align the lens module 400.

The configuration of the camera module according to the embodiment of the present invention has been briefly as described herein-above. The configuration of the magnetic member and the yoke according to the embodiment of the present invention will be detailed herein-below with reference to the drawings.

Figure 2A:
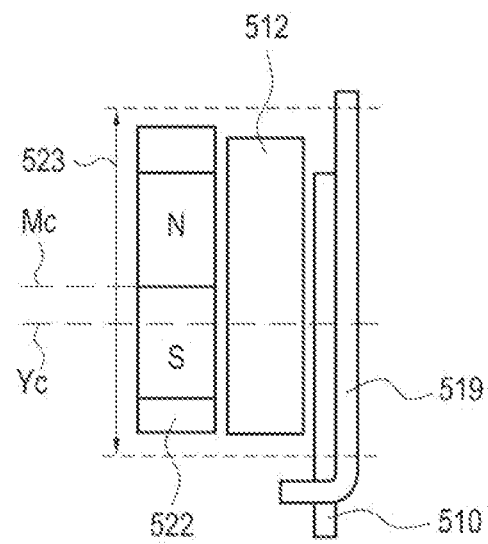
FIG. 2A is an explanatory view showing a magnetic member and a yoke according to an embodiment of the present invention.

FIG. 2A is the explanatory cross-sectional view of a portion of the camera module taken along the optical axis in order to illustrate the magnetic member and the yoke according to the embodiment of the present invention.

Referring to FIG. 2A, the yoke 519 is longer than the magnetic member 522 in a direction of the optical axis in the embodiment of the present invention. Preferably, the yoke 519 is formed in such a manner that a top side of the yoke 519 is positioned above a top side of the magnetic member 522 over the entire moving section 523 of the magnetic member 522. The reason that the yoke 519 is longer than the magnetic member 522 in a direction of the optical axis is to minimize the returning force of the lens module 400 in a downward direction, which occurs due to the attraction force between the magnetic member 522 and the yoke 519. The more detailed description will be given below with respect thereto.

The magnetic member 522 has a center Mc, which tends to move toward a center Yc of the yoke 519 to be aligned therewith. If the yoke 519 is shorter than the magnetic member 522 in a direction of the optical axis as in the prior art described above, the returning force in a downward direction acts intensively due to the attraction force between the yoke 519 and the magnetic member 522, so that it is needed to consume the large amount of the electric current when the lens module 400 moves in an upward direction.

Accordingly, in the embodiment of the present invention, the returning force of the lens module 400 in a downward direction is minimized by making the yoke 519 to be longer than the magnetic member 522 in a direction of the optical axis.

Figure 2B:
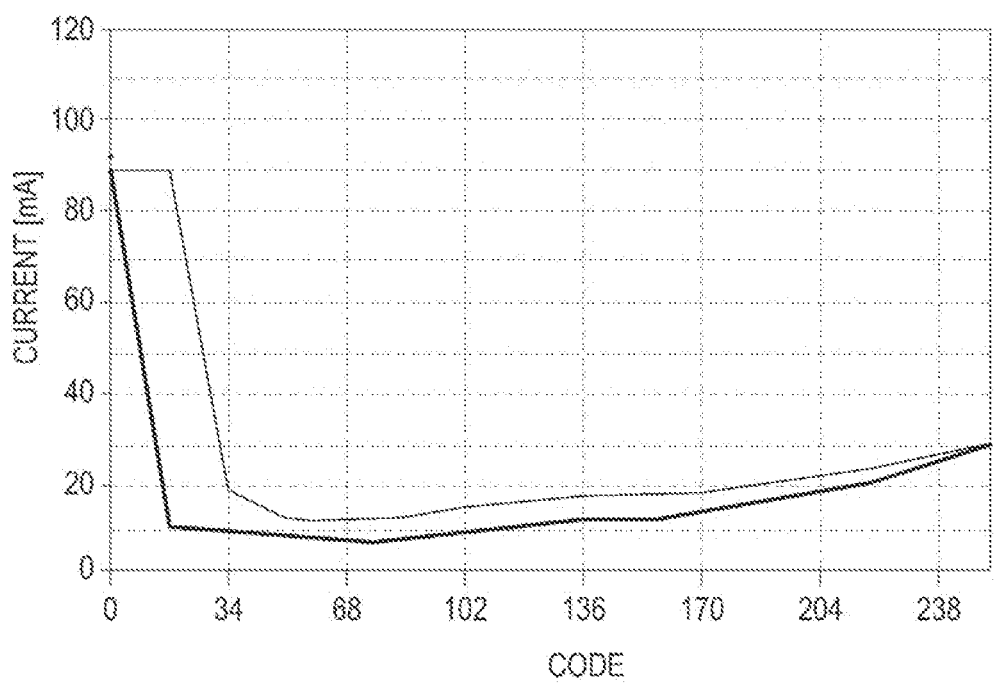
FIG. 2B is a graph showing the electric current consumption when performing the auto-focusing function in a camera module according to an embodiment of the present invention.

According to the embodiment of the present invention, the electric current advantageously decreases when the lens module 400 moves in an upward direction. FIG. 2B illustrates the current consumption when performing the auto-focusing function in the camera module according to the embodiment of the present invention. Referring to FIG. 2B, a maximum current that is needed when performing the auto-focusing function within a section between Code 34 and Code 255 is 30 mA. The code value is received from an image sensor processor (ISP), which means a value indicating a position to which the lens module 400 moves between the stoppers 518A and 518B.

The advantages of the present invention will be detailed in comparison with the prior art shown in FIG. 3.

Figure 3A:
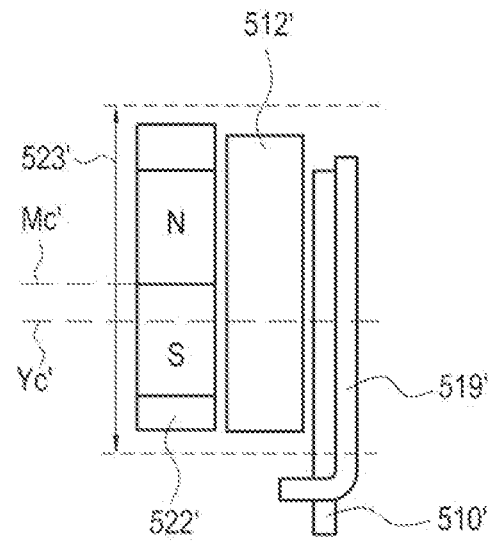
FIG. 3A is an explanatory view showing a magnetic member and a yoke according to prior art.
Figure 3B:
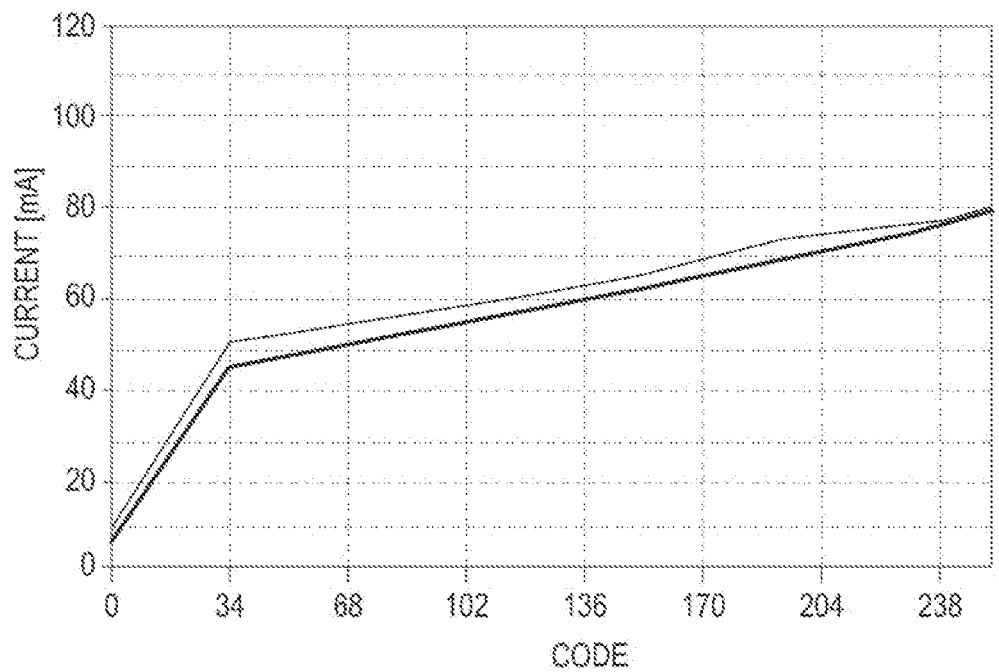
FIG. 3B is a graph showing the electric current consumption when performing the auto-focusing function in a camera module according to prior art.

FIG. 3A is an explanatory view showing a cross-sectional area of a portion of the camera module taken along the optical axis in order to illustrate a magnetic member and a yoke according to the prior art. FIG. 3B is a graph showing the current consumption necessary to the performance of the auto-focusing function in the camera module as shown in FIG. 3A.

Referring to FIG. 3A, the yoke 519' of the camera module according to the prior art is shorter than the magnetic member 522' in a direction of the optical axis, and a top side of the magnetic member 522' is located above a top side of the yoke 519' over the entire moving section 523' of the magnetic member 522'. Accordingly, the returning force due to the attraction force between the magnetic member 522' and the yoke 519' acts intensively in a downward direction in the prior art. It is because a center Mc' of the magnetic member 522' tends to move toward a center Yc' of the yoke 519' to be aligned therewith as described above.

Accordingly, the force to overcome the returning force is needed in order to move the lens module in a direction of the optical axis in the prior art, and thus the electric current consumption increases. FIG. 3B shows the electric current consumption when performing the auto-focusing function in the camera module according to the prior art. Referring to FIG. 3B, the electric current consumption within the section between Code 34 and Code 255 is up to 80 mA in the prior art. In consideration of the fact that the maximum electric current consumption within the section between Code 34 and Code 255 is 30 mA in the embodiment of the present invention as described with reference to FIG. 2B, the embodiment of the present invention exhibits the improvement of about 266% in the power consumption when compared to the prior art.

As shown in FIG. 2B and FIG. 3B, there is a phenomenon that the current waveform is distorted within the section between Code 0 and Code 34. Additionally, there is a phenomenon that the drive waveform is distorted within the section between Code 0 and Code 34. These phenomena will be detailed with reference to FIG. 4.

Figure 4A:
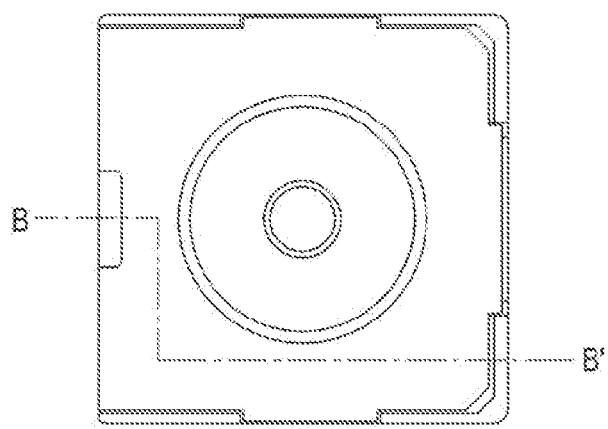
FIG. 4A is a front view of a camera module according to an embodiment of the present invention.
Figure 4B:
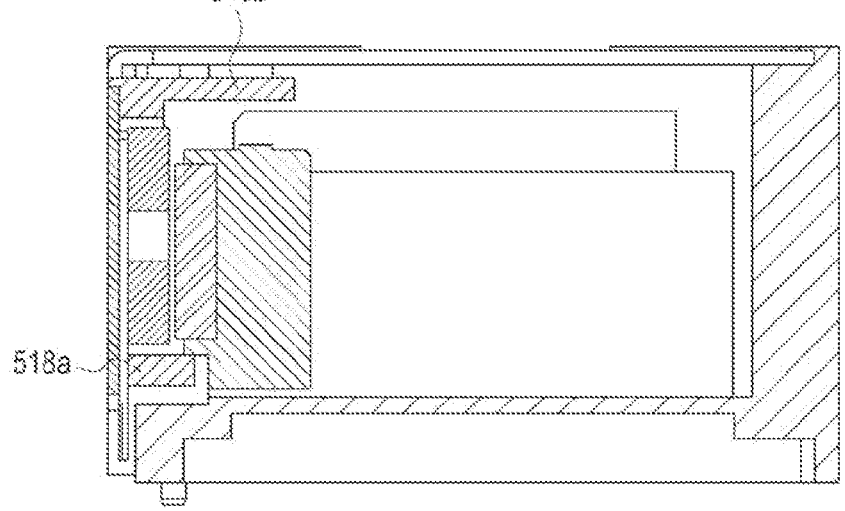
FIG. 4B and FIG. 4C are cross-sectional views taken along a path B-B' of FIG. 4A.
Figure 4C:
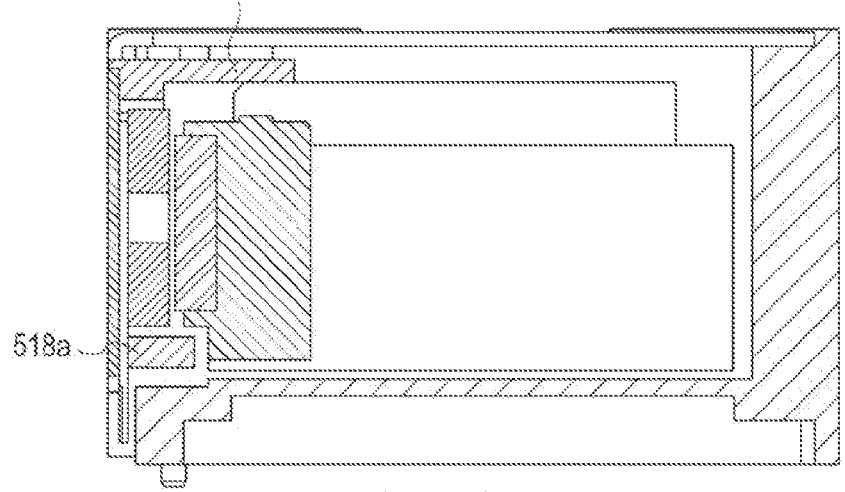

FIG. 4A is a front view of the camera module according to the embodiment of the present invention; FIG. 4B and FIG. 4C are cross-sectional views taken along a line B-B' shown in FIG. 4A; and FIG. 4D and FIG. 4E are graphs showing the drive waveform and the current waveform.

Figure 4D:
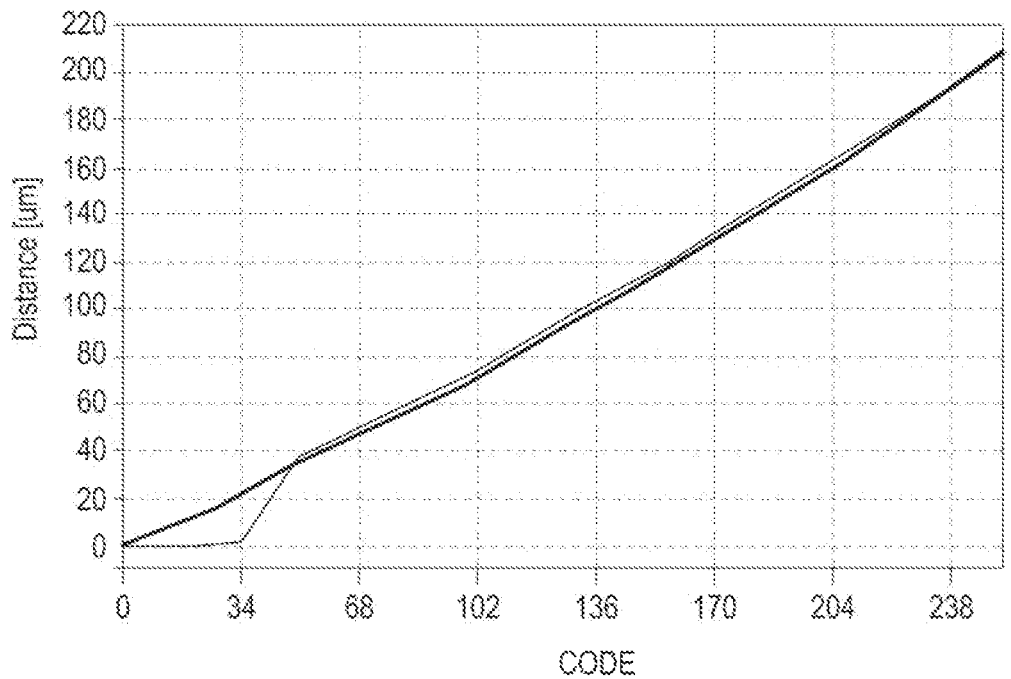
FIG. 4D is a graph showing drive waveforms of a camera module according to an embodiment of the present invention.
Figure 4E:
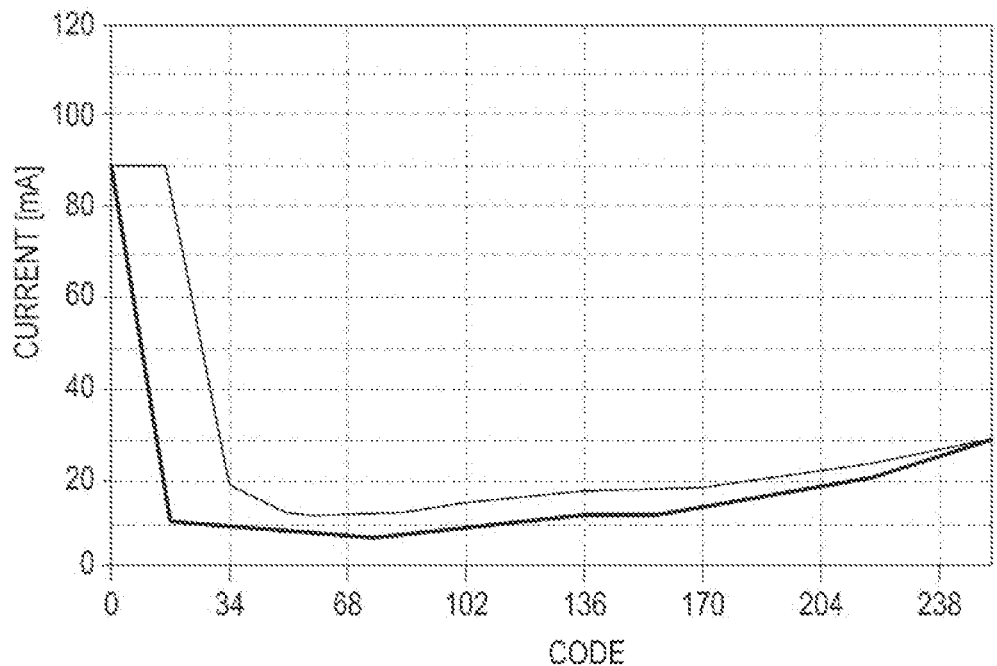
FIG. 4E is a graph showing current waveforms of a cameral module according to an embodiment of the present invention.

Referring to FIG. 4D and FIG. 4E, the drive waveform and the current waveform are distorted within the section between Code 0 and Code 34. It is because there are some cases that the lens module 400 is in a state of being closer to the lower stopper 518A or the upper stopper 518B as shown in FIG. 4B and FIG. 4C.

In other words, the phenomena of the waveform distortion is due to the fact that the excessive current is applied when the lens module 400 gets closer to the lower stopper 518A or the upper stopper 518B, so that the coils are overheated and the hysteresis performance is locally lowered owing to the excessive current.

Accordingly, in order to avoid the distortion of the electric current, the embodiment of the present invention provides a way of performing the lens focusing function, while the lens module 400 is in a state of not being closer to the stopper 518A and 518B as described below.

The camera module according to the embodiment of the present invention further comprises a controller (not shown) for implementation of the above. In the embodiment, the controller is installed on an inner side of the drive module frame 510 having the coils 512 mounted thereon, i.e., adjacent to the position sensor 532; otherwise, the controller is integrated into the position sensor 532 as a one-chip.

The controller determines an available moving section by applying a first determined correction value to a maximum moving section of the lens module 400 in order to allow the forward and backward movement of the lens module 400 between locations spaced from the lower stopper 518A and the upper stopper 518B with a predetermined distance. In other words, the controller determines the available moving section by applying the determined correction value to the location of the lens module 400 detected by the position sensor 532, while the lens module 400 is in a state of being closer to the lower module 518A; and by applying the determined correction value to the location of the lens module 400 detected by the position sensor 532, while the lens module 400 is in a state of being closer to the upper module 518B.

The maximum moving section means the section between one location of the lens module 400 detected by the position sensor 532, while the lens module 400 is in a state of being closer to the lower stopper 518A, and the other location of the lens module 400 detected by the position sensor 532, while the lens module 400 is in a state of being closer to the upper stopper 518B. The available moving section corresponds to the section between the location spaced from the lower stopper 518A with a predetermined distance and the location spaced from the upper stopper 518B with a predetermined distance, and it means that the lens module 400 can move within the available moving section while performing the auto-focusing.

Various kinds of method may be used for detecting the location of the lens module 400. For instance, the method using the Hall sensor or the method using a light emitting diode and a photo diode may be employed.

Further details will be given below with respect to a method for detecting the location of the lens module 400 by means of the Hall sensor and determining the available moving section of the lens module on the basis of the detected location of the lens module 400.

The controller applies to the drive module 520 the electric current that allows the lens module 400 to get closer to the lower stopper 518A, and then determines magnetic flux detected by the Hall sensor as a lower limit value corresponding to the maximum lower location of the maximum moving section, while the lens module 400 is in a state of being closer to the lower stopper 518A. Thereafter, the controller applies a first correction value to the lower limit value to thereby determine a lower limit value of the available moving section.

Similarly, the controller applies to the drive module 520 the electric current that allows the lens module 400 to get closer to the upper stopper 518B, and then determines magnetic flux detected by the Hall sensor as an upper limit value corresponding to the maximum upper location of the maximum moving section, while the lens module 400 is in a state of being closer to the upper stopper 518B. Thereafter, the controller applies a first correction value to the upper limit value to thereby determine an upper limit value of the available moving section.

The controller can store in a memory the information regarding the determined available moving section, i.e., the upper limit value and the lower limit value of the available moving section. If the upper limit value and the lower limit value of the available moving section are stored in the memory, it is advantageously possible to perform the focusing function within the determined available moving section without any further correcting operation. The upper limit value and the lower limit value may be the values that are obtained by digitalizing signals inputted from the position sensor 532 with a determined number of bit.

According to an embodiment, a designer or a user may input at least one of the upper limit value and the lower limit value of the available moving section. In such a case, it is possible to determine the other value by adding or subtracting a determined value based on the upper limit value or the lower limit value of the available moving section.

The first determined correction value is represented as a magnetic flux and its magnitude varies depending on a scale interval used in a drive integrated chip (IC). For example, if a section of 128 mT magnetic flux is divided into 128 subsections for use in the drive IC, the first correction value may be determined as 1 mT corresponding to the magnetic flux of a subsection or as a smaller value than 1 mT. Also, the first correction value may be determined as a variable value. The variable value is for the purpose of taking the product difference into account. For example, the sections of 50.2 mT, 50.7 mT and 50.9 mT magnetic flux become the section of 51 mT magnetic flux by means of the variable value.

Herein-below, an example regarding the determination of the available moving section will be detailed with reference FIG. 5.

Figure 5A:
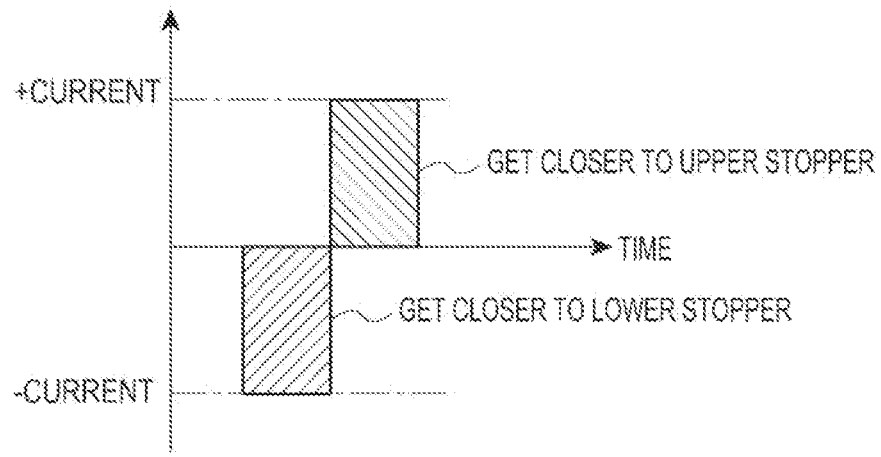
FIG. 5A and FIG. 5B are an explanatory view showing a determination of an available moving section according to an embodiment of the present invention.

As shown in FIG. 5A, the controller applies the electric current of a first direction (minus current) to the coils 512 to thereby make the lens module 400 to get closer to the lower stopper 518A. In that state, the controller detects the magnetic flux at the maximum lower location of the lens module 400 according to signals received from the position sensor 532. Also, the controller applies the current of a second direction (plus current) to the coils 512 to thereby make the lens module 400 to get closer to the upper stopper 518B. In that state, the controller detects the magnetic flux at the maximum upper location of the lens module 400 according to signals received from the position sensor 532.

Figure 5B:
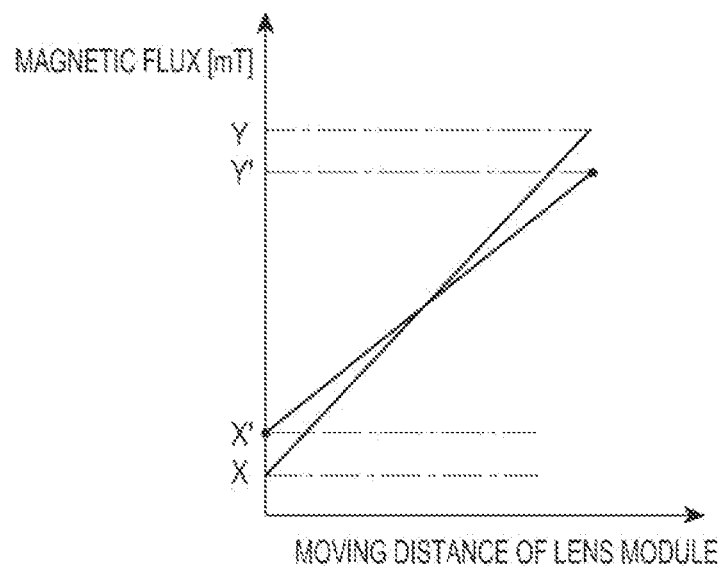

Thereafter, the controller determines the available moving section of the lens module using the detected magnetic flux as illustrated in FIG. 5B. This will be detailed below.

For example, it is assumed that the first correction value for determining the available moving section is 1 mT and that the magnetic flux (X) detected in a state of the lens module 400 being closer to the lower stopper 518A is 10 mT. In other words, it is assumed that the maximum lower location of the lens module 400 within the maximum moving section is the location corresponding to 10 mT. In this case, the controller determines 11 mT as the magnetic flux (X') corresponding to the available lower limit within the available moving section, wherein 11 mT is obtained by applying the first determined correction value 1 mT to the magnetic flux (X) 10 mT.

Similarly, it is assumed that the first correction value for determining the available moving section is 1 mT and that the magnetic flux (Y) detected in a state of the lens module 400 being closer to the upper stopper 518B is 100 mT. In other words, it is assumed that the maximum upper location of the lens module 400 within the maximum moving section is the location corresponding to 100 mT. In this case, the controller determines 99 mT as the magnetic flux (Y') corresponding to the available upper limit within the available moving section, wherein 99 mT is obtained by applying the first determined correction value 1 mT to the magnetic flux (Y) 100 mT.

In other words, the controller determines a magnetic flux range (X'-Y') corresponding to the available moving section by applying the first determined correction value to the magnetic flux range (X-Y) corresponding to the maximum moving section of the lens module 400 according to the above-described process. When the determination of the available moving section is completed, the lens module 400 does not move into the section corresponding to the magnetic flux range (X-X') and the magnetic flux range (Y-Y') while performing the auto-focusing function. In other words, the lens module 400 moves within the range not to make the lens module to get closer to the stoppers 518A and 518B while performing the auto-focusing function, so that the linearization of the drive waveform and the current waveform may be advantageously attained.

Figure 6A:
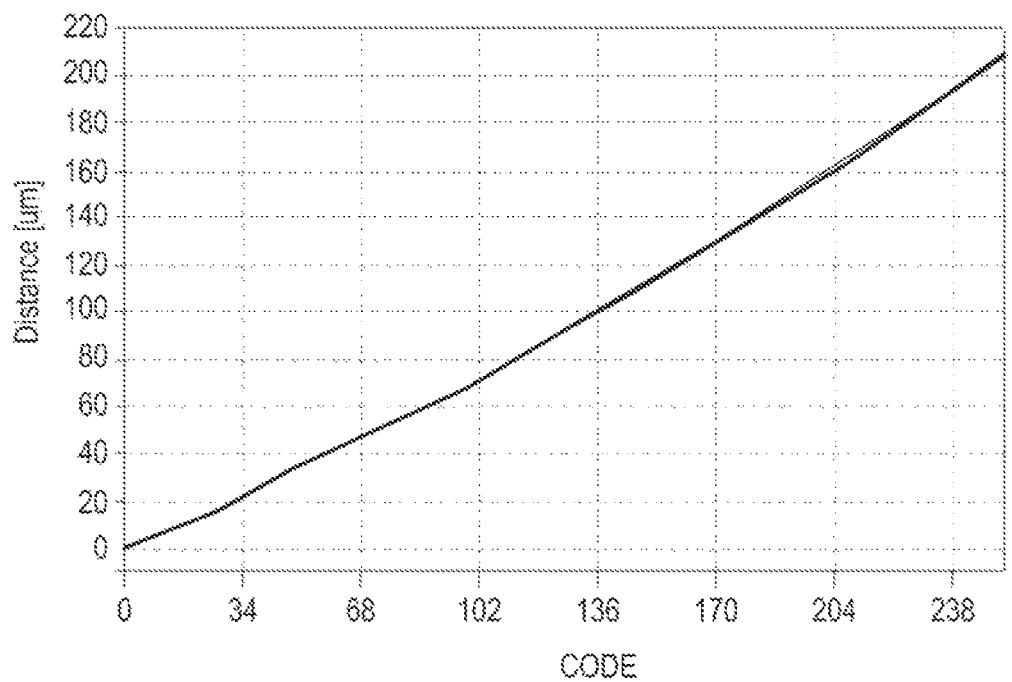
FIG. 6A is a graph showing drive waveforms of a camera module according to another embodiment of the present invention.
Figure 6B:
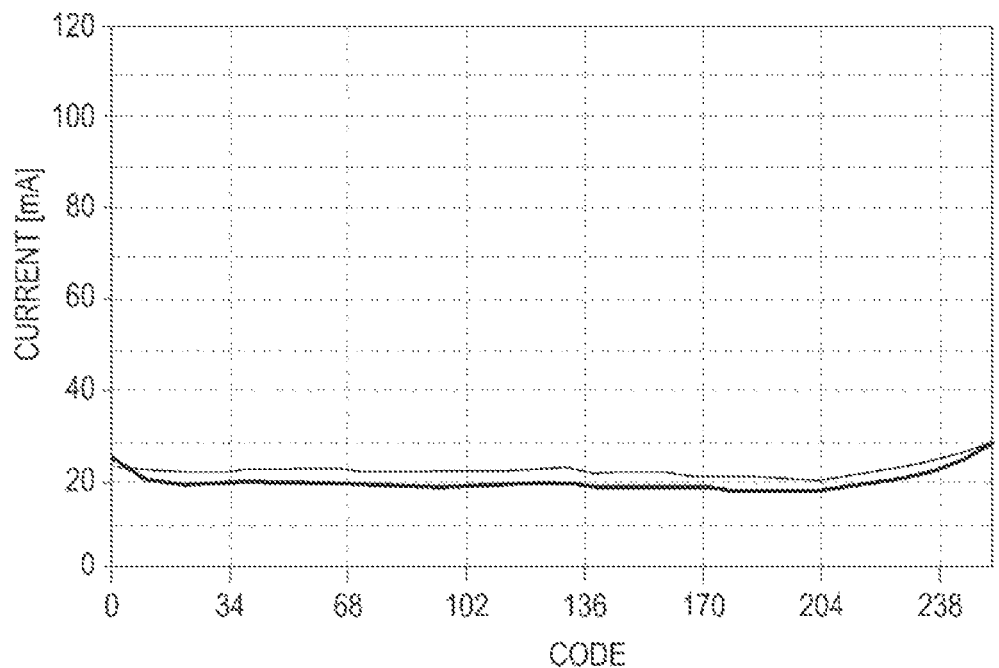
FIG. 6B is a graph showing current waveforms of a camera module according to another embodiment of the present invention.

The linearization of the drive waveform and the current waveform by means of the determination of the available moving section is illustrated in FIG. 6A and FIG. 6B. Referring to FIG. 6A and FIG. 6B, the linearization is significantly improved compared to that in FIG. 4D and FIG. 4E, which show the drive waveform and the current waveform without the determination of the available moving section.

Referring to FIG. 5, if the available lower limit of the lens module 400 is excessively spaced from the lower stopper 518A according to the determined lower limit value or the available upper limit is excessively spaced from the upper stopper 518B according to the determined upper limit value, i.e., if the available lower and upper limits are deviated more than predetermined critical values, the controller may re-correct the lower limit value and the upper limit value. Whether or not there is any excessive deviation may be decided by a measurement received from an external apparatus for measuring a distance between the stoppers 518A, 518B and the lens module 400.

In order to perform this operation, the controller may re-correct the lower limit value and the upper limit value of the available moving section by adding/subtracting a second determined correction value to/from the available lower limit or the available upper limit. The second determined correction value may be a value which is obtained by dividing the first correction value by a determined ratio. Preferably, the determined ratio is chosen in a range between 1 and 5. A process for re-correcting the lower limit value and the upper limit value will be detailed with reference to FIG. 5C and FIG. 5D.

Figure 5C:
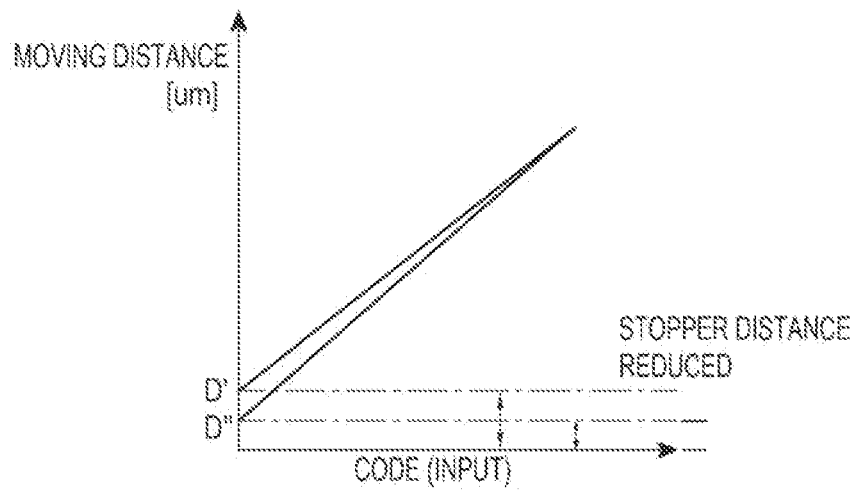
FIG. 5C and FIG. 5D are an explanatory view showing a process for re-correcting the available moving section.

For instance, assuming that the distance between the lens module 400 and the lower stopper 518A is determined as 20 μm at the available lower limit D', i.e. at the location of the lens module 400 closest to the lower stopper 518A within the available moving section as shown in FIG. 5C. If it is decided that a distance between the lens module 400 and the stopper is excessively large at the available lower limit D', for example, if the distance between the lens module 400 and the lower stopper 518A is larger than the determined critical value, the controller performs the re-correction to thereby shift from the available lower limit D' to the corrected available lower limit D".

Figure 5D:
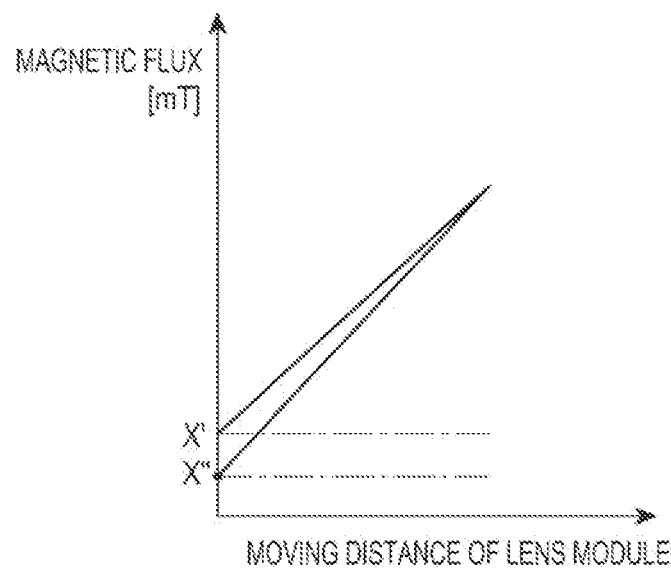

In other words, the magnetic flux (X") corresponding to the corrected available lower limit (D") may be determined as the value corresponding to the available lower limit by applying the second determined correction value to the magnetic flux (X') corresponding to the available lower limit (D') as shown in FIG. 5D.

With this performance of the re-correction, the more accurate auto-focusing function can be advantageously performed. The embodiment described with reference to FIG. 5 may be combined with the embodiment described with reference to FIG. 2; otherwise, these two embodiments may be practiced separately.

Herein-above, the configuration of the yoke according to the embodiment of the present invention and the method of determining the available moving section according to the embodiment of the present invention have been described. Herein-below, a drive circuit mounted to a camera module according to the embodiment of the present invention will be described.

Figure 7A:
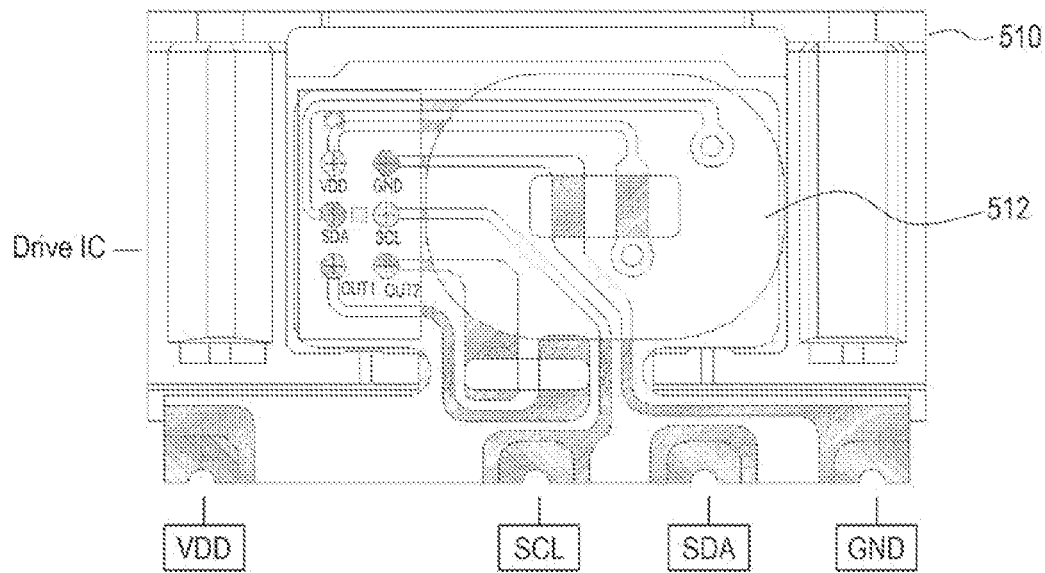
FIG. 7A and FIG. 7B are an illustrative view showing a drive IC according to an embodiment of the present invention.
Figure 7B:
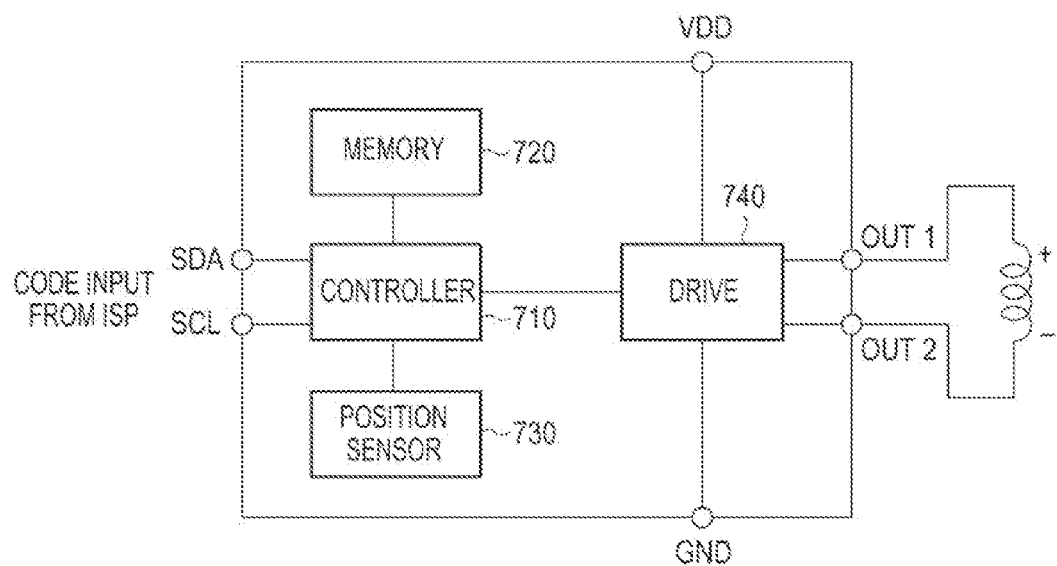

FIG. 7A is the illustrative view of a printed circuit of a Drive Integrated Chip (Drive IC) according to an embodiment of the present invention; and FIG. 7B is the illustrative view of Drive Integrated Chip (Drive IC) in the form of one-chip according to an embodiment of the present invention.

Referring to FIG. 7, the Drive IC according to the embodiment of the present invention is mounted on a drive module frame 510. FIG. 7 shows that the Drive IC is mounted beside the coils 512, but the location thereof varies depending on an embodiment. For instance, the drive IC may be mounted within an inner space of the coils.

The Drive IC in the form of the one-chip according to the embodiment of the present invention comprises a controller 710, a memory 720, a position sensor 730 and a drive 740.

The controller 710 corresponds to the controller described with reference to FIG. 5. In other words, the controller performs the correcting operation for determining the available moving section. Also, when completing the determination of the available moving section, the controller 710 performs the mapping of a code value used in the image sensor processor to the determined available moving section to thereby store a mapped value in the memory 720. For instance, if the value between Code 0 and Code 255 is used, the value of Code 0 is stored to correspond to the available lower limit of the available moving section, while the value of Code 255 is stored to correspond to the available upper limit of the available moving section. The controller 710 equally divides the span between the available lower limit and the available upper limit and maps a divided value to a code value to thereby store a mapped value. Also, it is possible to store only the available upper limit and the available lower limit in the memory 720, and determine a divided value based on the available upper limit and the available lower limit. Thereafter, it is possible to map the divided value to a code value received from the image sensor processor.

Also, the controller 710 may read a value, which is mapped to a code value received from the image sensor when controlling the position of the lens module 400, and then transfers the read value to the drive 740.

The memory 720 stores information related to the available moving section. For instance, the memory 720 may store the lower limit value and the upper limit value of the available moving section. Also, it may further store the first correction value and the second correction value for determining the available moving section and for the re-correction. Additionally, the memory 720 may store the mapped value obtained by mapping the code value used in the image sensor processor to the determined available moving section.

The position sensor 730 corresponds to the position sensor 532 described with reference to FIG. 1. The position sensor 730 detects a current position of the lens module by sensing a location of the magnetic member 522 and a variation thereof.

The drive 740 determines a direction and amount of electric current for adjusting the location of the lens module 400 according to a signal inputted from the controller 710, and then outputs electric current at OUT1 and OUT2 based on its determination.

The embodiments of the present invention described above may be implemented through various ways. For instance, the embodiment of the present invention may be implemented by a hardware, a software or a combination thereof. If the software is applied, it is implemented as the software executing on one or more of processors using various operating systems or platforms. Additionally, such software may be made up by using any one of many appropriate programming languages, and may be compiled into an executable machine language code or an intermediate code that is executed on a framework or a virtual machine.

Further, if the embodiments of the present invention are executed on one or more of the processors, it is implemented by the processor readable medium (e.g., a memory, a floppy disk, a compact disk, an optical disk or a magnetic tape etc.) recorded with one or more of the programs for executing the ways of implementing various embodiments of the present invention discussed.

It would be obvious to one of ordinary skill in the art that the electronic device including the antenna of non-contact near field communication and the wireless charging coil portion as described above is not limited to the embodiments and the drawings in the specification, but many types of substitution, variation and change may be possible within a technical scope of the present invention.

What is claimed is:

1. A drive control apparatus of a camera module, comprising:
    a lens module movable along an optical axis;
    a first stopper and a second stopper defining a maximum moving section of the lens module; and,
    a controller configured to determine an available moving section by applying a predetermined correction value to the maximum moving section,
    wherein the maximum moving section is a section between a first position of the lens module at which the lens module is in contact with the first stopper and a second position of the lens module at which the lens module is in contact with the second stopper,
    wherein the available moving section is a section between a third position of the lens module at which the lens module is spaced from the first position in a direction toward a center of the maximum moving section and a fourth position of the lens module at which the lens module is spaced from the second position in a direction toward the center of the maximum moving section,
    wherein each of a first distance of the third position from the first position and a second distance of the fourth position from the second position is larger than zero and is equal to or less than a predetermined critical value, and
    wherein the controller is configured to move the lens module only within the available moving section while performing an auto-focusing function.

2. The drive control apparatus of a camera module as claimed in claim 1, further comprising a sensor for detecting a position of the lens module,
    wherein the controller determines the available moving section by applying the correction value to each sensed value received from the sensor.

3. The drive control apparatus of a camera module as claimed in claim 2, further comprising a memory for storing a first determined value representing the third position and a second determined value representing the fourth position.

4. The drive control apparatus of a camera module as claimed in claim 3, wherein the first determined value and the second determined value are obtained by digitalizing a sensed value received from the sensor with the determined number of bit.

5. A drive control apparatus of a camera module, comprising:
    a lens module movable along an optical axis;
    a first stopper and a second stopper defining a maximum moving section of the lens module; and,
    a memory for storing a first determined value representing a third position of the lens module, a second determined value representing a fourth position of the lens module, and a predetermined critical value,
    wherein the maximum moving section is a section between a first position of the lens module at which the lens module is in contact with the first stopper and a second position of the lens module at which the lens module is in contact with the second stopper,
    wherein the available moving section is a section between the third position of the lens module at which the lens module is spaced from the first position in a direction toward a center of the maximum moving section and the fourth position of the lens module at which the lens module is spaced from the second position in a direction toward the center of the maximum moving section,
    wherein each of a first distance of the third position from the first position and a second distance of the fourth position from the second position is larger than zero and is equal to or less than a predetermined critical value, and
    wherein the lens module is moved only within the available moving section while an auto-focusing function is performed.

6. A drive control apparatus of a camera module, comprising:
    a lens module movable along an optical axis;
    a first stopper and a second stopper defining a maximum moving section of the lens module;
    a magnetic member coupled to a side of the lens module;
    coils disposed to face the magnetic member with a distance there-between and generating a drive force of the lens module;
    a yoke having the coils attached thereto, wherein a length of the yoke in a direction of an optical axis is defined to be greater than a length of the magnetic member in a direction of the optical axis; and
    a controller configured to determine an available moving section by applying a predetermined correction value to the maximum moving section,
    wherein the maximum moving section is a section between a first position of the lens module at which the lens module is in contact with the first stopper and a second position of the lens module at which the lens module is in contact with the second stopper,
    wherein the available moving section is a section between a third position of the lens module at which the lens module is spaced from the first position in a direction toward a center of the maximum moving section and a fourth position of the lens module at which the lens module is spaced from the second position in a direction toward the center of the maximum moving section,
    wherein each of a first distance of the third position from the first position and a second distance of the fourth position from the second position is larger than zero and is equal to or less than a predetermined critical value, and
    wherein the controller is configured to move the lens module only within the available moving section while performing an auto-focusing function.

7. The drive control apparatus of a camera module as claimed in claim 6, wherein the length of the yoke in a direction of the optical axis is defined to be greater than the length of the magnetic member in a direction of the optical axis so as to allow both longitudinal ends of the magnetic member to be included within a longitudinal range of the yoke in the whole of a maximum moving section of the lens module when the yoke and the magnetic member are placed on an extension line in a direction of the same optical axis.

8. The drive control apparatus of a camera module as claimed in claim 6, further comprising a sensor for detecting a position of the lens module, wherein the controller determines the available moving section by applying the correction value to each sensed value received from the sensor.

9. The drive control apparatus of a camera module as claimed in claim 8, further comprising a memory for storing a first determined value representing the third position and a second determined value representing the fourth position.

10. The drive control apparatus of a camera module as claimed in claim 9, wherein the first determined value and the second determined value are obtained by digitalizing a sensed value received from the sensor with the determined number of bit.

11. A method of controlling drive of a camera module, comprising a lens module movable along an optical axis, and a first and a second stoppers defining a maximum moving section;

the method comprising steps of:
detecting the maximum moving section of the lens module; and,
determining an available moving section by applying a determined correction value to the maximum moving section so as to make the lens module to move between locations spaced from the first and the second stoppers with a predetermined distance, wherein the maximum moving section is a section between a first position of the lens module at which the lens module is in contact with the first stopper and a second position of the lens module at which the lens module is in contact with the second stopper, wherein the available moving section is a section between a third position of the lens module at which the lens module is spaced from the first position in a direction toward a center of the maximum moving section and a fourth position of the lens module at which the lens module is spaced from the second position in a direction toward the center of the maximum moving section, wherein each of a first distance of the third position from the first position and a second distance of the fourth position from the second position is larger than zero and is equal to or less than a predetermined critical value, and wherein the lens module is moved only within the available moving section while an auto-focusing function is performed.

* * * * *